2,773,746

METHOD OF EVALUATING POLYMERIZED VINYL CHLORIDE SYSTEMS

Harold A. Reehling, Lancaster, Pa., assignor to Armstrong Cork Company, Lancaster, Pa., a corporation of Pennsylvania No Drawing. Application July 14, 1955, Serial No. 522,171

10 Claims. (Cl. 23—230)

This invention relates generally to resinous systems, and more particularly to resinous systems containing polymerized vinyl chloride. Still more particularly, it relates to a method of determining the stability of a resinous system containing polymerized vinyl chloride.

Polymerized vinyl chloride has been widely used in a multitude of applications. This material may be used as a homopolymer, as in polyvinyl chloride, or it may be copolymerized, as with vinyl esters and the like. Vinyl chloride-vinyl acetate copolymers have proved peculiarly advantageous in many uses. The final product may consist of polymerized vinyl chloride alone, or the polymerized vinyl chloride may be utilized with one or more of suitable plasticizers. Additionally, there may be used pigments, fillers, lubricants, and various other strengthening, extending, or modifying agents. The finished object may be rolled, molded, extruded, pressed, or calendered into shape, depending on the precise nature of the product.

Polymerized vinyl chloride, however, in any of its various forms is subject to one shortcoming. Under certain conditions, the polymerized vinyl chloride may be degraded in such manner as to release hydrochloric acid from the polymeric molecule. Although the amount of hydrochloric acid released may be quite small, nevertheless the product, whatever it may be, is likely to suffier detrimental changes. Embrittlement often occurs, and if the polymerized vinyl chloride has been utilized in goods containing a colorful or decorative pattern, the visual effect of the pattern may be drastically changed by the acid release. Goods produced in a homogeneous color may show a change in color in those areas subjected to degradation conditions, and thus present a mottled appearance; in the flooring industry, this renders replacement of a portion of the polymerized vinyl chloride-containing floor difficult, if not impossible.

To overcome the detrimental effects of the release of hydrochloric acid from products containing polymerized vinyl chloride, it has been the custom to utilize one or more of various stabilizers. Such stabilizers may be basic lead salts, for example the product sold under the name "Tribase." Stabilizers may also consist of calcium, barium, cadmium salts, as for example, the stearates. Additionally, the stabilizers may consist of barium-cadmium salts or barium-zinc salts. Tin salts are also useful as stabilizers, as for example dibutyl tin oxide. Certain amines also serve as excellent stabilizers for polymerized vinyl chloride. Generally speaking, suitable stabilizers for the polymerized vinyl chloride are acid acceptors; some degree of stabilization against the detrimental effects of hydrochloric acid release may be obtained from the use of almost any acid acceptor.

Despite the use of various stabilizers or stabilizing systems, polymerized vinyl chloride under the proper conditions may still release sufficient hydrochloric acid to cause degradation of the product. In the production of a polymerized vinyl chloride, a slight variation in reaction condition may produce polymeric vinyl chloride having varying degrees of stability toward heat and/or light. For example, two batches of polyvinyl chloride prepared under apparently identical conditions may differ in that one batch will be relatively unstable in exposure to heat and/or light, while the other batch will be relatively stable. Thus, it can be seen that it is difficult to estimate in advance the degree of stability of a resin comprising a polymerized vinyl chloride. This has the undesirable result that it is difficult to determine the amount of stabilizer to put into any product containing polymerized vinyl chloride. Furthermore, it is difficult to estimate the stability of a batch containing polymerized vinyl chloride whether or not a stabilizer is to be used. Thus, it would be exceedingly valuable to have available a simple test to estimate the stability of a resinous system containing polymerized vinyl chloride.

It is the primary object of the present invention to supply such a test. It is a further object to supply a test wherein the instability of a polymerized vinyl chloride may be estimated by the eye. It is a still further object to supply a method for determining the relative instability of resinous systems containing polymerized vinyl chloride by comparison of color changes.

To this end, the invention contemplates incorporating ultramarine blue in a resinous system containing as an ingredient thereof a polymerized vinyl chloride. The resulting mixture is then exposed to degradation conditions. The degree of stability may then be estimated by inspection of the color change of the exposed system as compared with the unexposed system.

The phrase "polymerized vinyl chloride" is meant to include homopolymers such as polyvinyl chloride and copolymers such as vinyl chloride-vinyl esters. Since it is the polymeric vinyl chloride that is subject to degradation, it is not material to the present invention precisely how the polymerized vinyl chloride occurs in the system. So long as polymerized vinyl chloride is present, the danger of degradation of it to hydrochloric acid will exist.

The ultramarine blue useful in the method of the present invention is a well-known pigment. Generally, it is not such an intense pigment as to find wide use in those applications calling for brilliant blue colors. Where a pigmented composition is to withstand heat, ultramarine blue is generally more desirable than other pigments, since it is exceptionally heat insensitive. Ultramarine blue is also extremely acid sensitive, and it is this property of the pigment that is utilized in the method of the present invention. Although ultramarine blue, as prepared by different manufacturers, may possess slightly different properties, they are all generally characterized by the properties described above. A typical analysis for ultramarine blue is as follows:

| | Percent |
|---|---|
| $SiO_2$ | 37–50 |
| $Al_2O_3$ | 23–29 |
| $Na_2O$ | 19–23 |
| S | 10–14 |
| Balance | 1–2 |

The amount of ultramarine blue to be used in the total composition will generally vary between about 0.1% and about 5% of the total composition. Preferably, however, an amount of ultramarine blue amounting to about 0.6–0.8% by weight of the total composition is used. The ultramarine blue may be incorporated into the resinous composition by known means as by mixing or milling, and the like. It is one of the advantages of the present invention that ultramarine blue is easily dispersible in polymerized vinyl chloride-containing compositions, even in the presence of plasticizers, fillers, stabilizers, and the like.

Once the ultramarine blue has been incorporated into the composition, the composition may be sheeted or otherwise formed into a suitable shape. The pigmented product may then be subjected to degradation conditions as by exposure of a sample to a temperature greater than about 300° F., and preferably in the range of about 325°–350° F. for a period of time varying between about 15 minutes and about 10 hours. Alternatively, the product may be exposed to ultraviolet light in the form of sunlight or by means of a suitable ultraviolet source lamp. If more drastic conditions are desirable, both heat and light may be used on the product.

Once the product has been exposed to the above-described degradation conditions, the product may be inspected either by the eye or by means of a suitable instrument. Exemplary of such instruments is the device known as "Color-Eye," made by the Instrument Development Laboratories, Inc., of Boston, Massachusetts. This instrument, and others like it, give a measurable reading of the intensity of specified color components. Thus, comparative values of color may readily be made.

The effect of the degradation conditions will manifest itself in the ultramarine blue-pigmented polymerized vinyl chloride-containing resin system by a change of color in the exposed product. The more degradation, the lighter the blue color appears in the normally more intensely blue product. Thus, it can be seen that various resin systems may be compared one with the other and with a nondegraded control to determine which system degrades more readily by hydrochloric acid release under identical conditions; the fainter the blue color in the degraded product, the more hydrochloric acid has been released.

The present method also allows the estimation of the effectiveness of various stabilizers or hydrochloric acid acceptors. By maintaining all composition and process variables in identical relationship and by varying the amount or kind of stabilizer put into the system, one can readily determine the effect of the stabilizer or stabilizers on that particular system by simply noting the differences in the intensity of the blue color that appears in each test. Here, too, a nondegraded control can be used to compare the efficiency of various stabilizers.

The following examples illustrate several embodiments of the present invention. All parts are by weight unless otherwise stated.

Example I

A master batch containing the following ingredients is thoroughly blended on an internal mixer.

| | Parts |
|---|---|
| "Vinylite VYVF" (vinyl chloride-vinyl acetate copolymer containing about 93%–95% vinyl chloride with an average molecular weight of about 24,000) | 130 |
| "Vinylite VYHH" (vinyl chloride-vinyl acetate copolymer containing about 85%–88% vinyl chloride with an average molecular weight of about 10,000) | 35 |
| Vanstay L ($Na_2HPO_4$ on clay carrier) | 2.5 |
| Paraplex G-62 (alkyd plasticizer) | 3.5 |
| Tricresyl phosphate | 75 |
| Whiting | 260 |
| Whiting, precipitated | 85 |

To portions of the above-described mix there is added titanium dioxide on the mill in the ratio titanium dioxide: master batch of 1:30 and ultramarine blue pigment (Calco 59–4590) in a pigment:master batch of 1:300.

After thorough mixing, the sheets are taken off and cut into squares of about 2" on a side for testing.

To a series of sheets prepared as described above there is also added 0.1%, 0.2%, and 1%, respectively, of a cadmium-barium laurate stabilizer known as "Stabilizer S-141." These sheets are to be compared with a sheet containing 0% stabilizer. An arbitrary color scale ranging from 1 to 5 is used wherein a rating of 1 shows no change detectable to the eye apparent in a degraded sample as compared with a nondegraded sample.

After maintaining samples of the above three specimens and the control at a temperature of 350° F. for 2 hours, the following results are noted:

| Percent stabilizer: | Color rating |
|---|---|
| 0 | 4 |
| 0.1 | 3 |
| 0.2 | 2 |
| 1 | 1 |

Example II

Batches of polyvinyl chloride purportedly prepared under identical conditions are milled with plasticizer and filler; no stabilizer is used. To the mix on the mill is added 0.7% by weight ultramarine blue based on the total weight of the mix. Sheets are formed and cut into examples and degraded as described in Example I.

Of three batches of polyvinyl chloride tested, one has a color rating greater than 5 and the other two have color ratings of 2, thus showing that one batch is significantly more unstable than the other two. The results are reproducible and all testing conditions are maintained as identical with one another as possible.

I claim:

1. The method of testing the stability against heat and light degradation of a resinous system containing as an ingredient thereof a polymerized vinyl chloride, which method comprises incorporating ultramarine blue in said system, exposing the resulting mixture to degradation conditions, and estimating the degree of stability of the system by the color change of the exposed mixture.

2. The method according to claim 1 wherein the amount of ultramarine blue is about 0.1%–5% by weight of the total system.

3. The method according to claim 2 wherein said amount is in the range of about 0.6%–0.8%.

4. The method according to claim 1 wherein said polymerized vinyl chloride comprises a copolymer of vinyl chloride and vinyl acetate.

5. The method according to claim 1 wherein said polymerized vinyl chloride comprises polyvinyl chloride.

6. The method according to claim 1 wherein said resinous system also contains filler, plasticizer, stabilizer, and additional pigment other than said ultramarine blue.

7. The method of testing the stability against heat and light degradation of a resinous system containing as an ingredient thereof a polymerized vinyl chloride, which method comprises incorporating ultramarine blue in said system, heating at least a portion of said system to a temperature in the range of about 300°–350° F. for a period of time of at least about 15 minutes, and estimating the degree of blue color change occurring in the system as compared with unheated mixture.

8. The method according to claim 7 wherein said ultramarine blue is incorporated in an amount in the range of about 0.1%–5% by weight of said resinuous system.

9. The method according to claim 7 wherein said polymerized vinyl chloride comprises a vinyl chloride-vinyl acetate copolymer.

10. The method according to claim 7 wherein said polymerized vinyl chloride comprises polyvinyl chloride.

References Cited in the file of this patent

Melville: Science Progress, volume 38, Number 149, January (1950), Edward Arnold and Company, London, pages 1–9.